(12) United States Patent
Welch

(10) Patent No.: US 6,386,349 B1
(45) Date of Patent: May 14, 2002

(54) COMPACT CLUTCH ASSEMBLY FEATURING DUAL SELECTIVELY-OPERATIVE ONE-WAY CLUTCHES

(75) Inventor: Sean M. Welch, Frankenmuth, MI (US)

(73) Assignee: Means Industries, Inc., Saginaw MI ( * ) Notice: Subject to any disclaimer, the term of this patent is extended or adjusted under 35 U.S.C. 154(b) by 0 days.

(21) Appl. No.: 09/764,199

(22) Filed: Jan. 17, 2001

(51) Int. Cl.[7] .............................................. F16D 41/12
(52) U.S. Cl. ...................... 192/43; 192/43.1; 192/69.1; 192/46; 192/45.1; 188/82.2
(58) Field of Search ...................... 192/43, 43.1, 41 R, 192/41 S, 41 A, 45.1, 48.92, 69.1, 46; 188/82.2; 464/81

(56) References Cited

U.S. PATENT DOCUMENTS 5,918,715 A  * 7/1999 Ruth et al. .................... 192/46
5,964,331 A  * 10/1999 Reed et al. ................. 192/45.1
6,065,576 A  * 5/2000 Shaw et al. ................ 192/45.1

* cited by examiner

Primary Examiner—Douglas C. Butler
(74) Attorney, Agent, or Firm—Brooks & Kushman, P.C.

(57) ABSTRACT

A clutch assembly includes a driving member rotatable about a first axis; a pair of driven members, disposed on respective sides of the driving member for rotation about the first axis; and a pinion that simultaneously meshes with gear teeth defined on each driven member such that rotary power transmitted between the driven members through the pinion causes the driven members to rotate in opposite rotational directions. A coupling is disposed between the driving member and each driven member. Each coupling includes a strut that is selectively permitted to mechanically couple the driving member and a given driven member for rotation in one direction while permitting overrun in the other direction. Each coupling further includes a strut retainer that prevents the struts from mechanically coupling the driving member with the given driven member when the strut retainer assumes a predetermined rotational position with respect to the given driven member.

14 Claims, 3 Drawing Sheets

COMPACT CLUTCH ASSEMBLY FEATURING DUAL SELECTIVELY-OPERATIVE ONE-WAY CLUTCHES

BACKGROUND OF THE INVENTION

1. Field of the Invention

The invention relates to "one-way" clutches wherein the clutch is selectively disabled to permit "free-wheeling" of the driven member in either rotational direction relative to the driving member.

2. Background Information

Clutches are used in a wide variety of applications to selectively couple power from a first rotatable "driving" member, such as a driving disk or plate, to a second, independently-rotatable "driven" member, such as a driven plate or disk. In one known variety of clutches, commonly referred to as "one-way" or "overrunning" clutches, the clutch "engages" to mechanically couple the driving member to the driven member only when the driving member seeks to rotate in a first direction relative to the driven member. Once so engaged, the clutch will release or decouple the driven member from the driving member only when the driving member rotates in a second, opposite direction relative to the driven member. Further, the clutch otherwise permits the driving member to freely rotate in the second direction relative to the driven member. Such "free-wheeling" of the driving member in the second direction relative to the driven member is also known as the "overrunning" condition.

Occasionally, it is desirable to deploy a plurality of such one-way clutches along a common rotational axis in order to selectively drive a given output shaft in a selected rotational direction notwithstanding continuous rotation of an input shaft in a single rotational direction. For example, in a known embodiment, a driving member is disposed about a common rotational axis between a pair of driven members, with the driving member being axially translated relative to one or the other of the driven members to thereby permit exclusive torque transmission between the driving member and a selected one of the driven members using a one-way clutch. Because each driven member includes a plurality of circumferentially-spaced gear teeth to define a respective bevel gear, and because each bevel gear simultaneous meshes with a common pinion, the pinion is caused to be driven in opposite directions depending upon which driven member is mechanically coupled for rotation with the driving member. In this manner, an output shaft coupled to the pinion is selectively driven in either direction based upon the selected axial position of the driving member. A "neutral" position is advantageously provided by axially translation of the driving member to a position intermediate the two driven members, whereby rotation of the driving member does not produce any rotary output. Unfortunately, the need to axially translate the driving member relative to the driven members (or, indeed, each of several coaxial clutch assemblies deployed along a common drive shaft) and the resultant actuating structures implicates greater levels of mechanical complexity and increases the overall size of each such clutch assembly.

SUMMARY OF THE INVENTION

It is an object of the invention to provide a clutch assembly with which to selectively couple an input shaft to an output shaft to thereby generate a rotary output in a selected rotational direction, which overcomes the deficiencies of the prior art.

Under the invention, a clutch assembly includes a driving member that is selectively and controllably rotatable about a first axis in each of two opposite rotational directions, for example, by an electric motor in accordance with a preferred method described further below. The driving member includes a first driving face that preferably defines a first reference surface that is generally perpendicular to the first axis. In a preferred embodiment, the driving member further includes a second driving face on the opposite side of the driving member that likewise preferably defines a second reference surface that is generally perpendicular to the first axis. The driving faces of the driving member each include at least one recess, with each recess defining a load-bearing shoulder that is operative when the driving member is rotated in the first direction, and with each recess preferably being adapted to receive a strut in the manner described further below. Significantly, each recess defined on the first driving face of the first driving is angularly offset from, i.e., is not axially aligned with, any recess defined on the driving member's second driving face.

The clutch assembly of the invention also includes a first driven member, also rotatable about the first axis, that includes a driven face in close-spaced opposition with the first driving face of the driving member and, hence, in the preferred embodiment, likewise defines a respective reference surface that is generally perpendicular to the first axis. The driven face of the first driven member includes a plurality of recesses, with each recess defining a respective load-bearing shoulder. A first coupling is disposed between the first driving face of the driving member and the driven face of the first driven member. The first coupling includes a first strut that, in a preferred embodiment, is carried by the driving member so as to rotate with the driving member. The first strut is moveable between a first position characterized by simultaneous abutting engagement of a respective end of the first strut with a respective shoulder of both the first driving face of the driving member and the driven face of the first driven member, and a second position characterized by non-engagement of the first strut with at least one of the first driving face of the driving member and the driven face of the first driven member (in the preferred embodiment, wherein the first strut is carried by the driving member within the recess defined in the driving member's first driving face, the second position is characterized by the nonengagement of the first strut with the driven face of the first driven member).

The first coupling also includes a first spring, for example, carried by the driving member, that urges the first strut toward the first position; and a first strut retainer rotatable about the first axis that operates to urge the first strut to the second position when the first strut retainer is rotated into a first predetermined rotational position relative to the driving member. By controlling the rotational position of the first strut retainer relative to the driving member, the first strut retainer is used to selectively enable or disable the nominal operation of the one-way planar clutch that is otherwise defined by the opposed members and the first coupling's spring-biased strut.

Critically, under the invention, the first strut retainer is rotatable about the first axis so as to rotate with the driving member only when the driving member is rotated in the first rotational direction relative to the first driven member, and, further, to rotate with the first driven member only when the driving member rotates in the second rotational direction relative to the first driven member. In this manner, the first strut is urged by the first strut retainer into the second, non-engaging position by controllably rotating the driving member in the second rotational direction into the first predetermined rotational position, whereupon the first one-way clutch defined by the driving member, the first driven member, and elements of the first coupling is disabled, with the driving member thereafter being free to "free-wheel" in the first rotational direction. It will be appreciated that, upon subsequent further rotation of the driving member in the second rotational direction relative to the driven member, the first strut retainer will rotate with the driving member out of the first predetermined rotational position, whereupon the thus-defined first one-way clutch is enabled to transmit power from the driving member to the first driven member upon subsequent relative rotation of the driving member in the first rotational direction and to "free-wheel" when the first driven member overruns the driving member while rotating in the first rotational direction.

As noted above, in a preferred embodiment, the clutch assembly further includes a second driven member rotatable about the first axis. The second driven member includes a driven face that is in close-spaced opposition with the second driving face of the driving member and, in the preferred embodiment, likewise defines a respective reference surface that is generally perpendicular to the first axis. The driven face of the second driven member includes a plurality of recesses, with each recess defining a respective load-bearing shoulder. A second coupling is likewise disposed between the second driving face of the driving member and the driven face of the second driven member.

As in the first coupling, the second coupling includes a second strut that is preferably carried by the driving member on its second driving face so as to rotate with the driving member. The second strut is likewise moveable between a first position characterized by simultaneous abutting engagement of a respective end of the second strut with a respective shoulder of both the second driving face of the driving member and the driven face of the second driven member, and a second position characterized by nonengagement of the second strut with at least one of the second driving face of the driving member and the driven face of the second driven member. The second coupling also includes a second spring urging the second strut toward the first position, as well as a second strut retainer that is rotatable about the first axis and that urges the second strut to the second position when the second strut retainer is rotated into a second predetermined rotational position relative to the driving member.

Once again, under the invention, by controlling the rotational position of the second strut retainer relative to the driving member, the second strut retainer is used to selectively enable or disable the nominal operation of the one-way planar clutch that is otherwise defined by the opposed members and the second coupling's spring-biased strut. As with the first strut retainer, the second strut retainer is rotatable about the first axis so as to rotate with the driving member only when the driving member is rotated in the first rotational direction relative to the second driven member, and, further, to rotate with the second driven member only when the driving member rotates in the second rotational direction relative to the first driven member. In this manner, the second strut is urged by the second strut retainer into the second, non-engaging position by controllably rotating the driving member into the second rotational direction into the second predetermined rotational position, whereupon the second one-way clutch defined by the driving member, the second driven member, and elements of the second coupling is disabled, with the driving member thereafter being free to "free-wheel" in the first rotational direction. It will be appreciated that, upon subsequent further rotation of the driving member in the second rotational direction relative to the driven member, the second strut retainer will rotate with the driving member out of the first predetermined rotational position, whereupon the thus-defined first one-way clutch is enabled to transmit power from the driving member to the first driven member upon subsequent relative rotation of the driving member in the first rotational direction and to "free-wheel" when the first driven member overruns the driving member while rotating in the first rotational direction.

In the preferred embodiment, the first and second driven members respectively include a plurality of circumferentially-spaced gear teeth defined on a radially-outward surface portion, for example, to thereby respectively define a bevel gear. Each bevel gear is positioned for simultaneous meshing engagement with a common pinion such that rotary power transmitted between the driven members through the pinion causes the driven members to rotate in opposite rotational directions. In this manner, the pinion is driven by a selected one of the driven members while the other of the driven members "free-wheels" by virtue of its respective, "disabled" one-way clutch, with the selected driven member dictating the direction in which the pinion rotates as the driving member is otherwise rotated in the first rotational direction.

In accordance with another feature of the invention, in a preferred embodiment, the first and second predetermined rotational positions are defined by the respective relative angular position of the recess defined in the respective first and second driving faces of the driving member. It will be appreciated that, where the clutch assembly employs a plurality of recesses on each of the driving member's driving faces, there will be a like number of "first and second rotational positions" for the strut retainers in which the strut retainers operate to "disable" the respective one-way clutches. In a preferred embodiment, the clutch assembly further includes a sensor, such as a Hall-effect sensor, which is advantageously used to detect the relative rotational position of the driving member for use in selectively operating the first and second one-way clutches of the preferred embodiment.

While an exemplary clutch assembly in accordance with the invention is illustrated and disclosed, such disclosure should not be construed to limit the claims. It is anticipated that various modifications and alternative designs may be made without departing from the scope of the invention.

DETAILED DESCRIPTION OF THE PREFERRED EMBODIMENT

Figure 1:
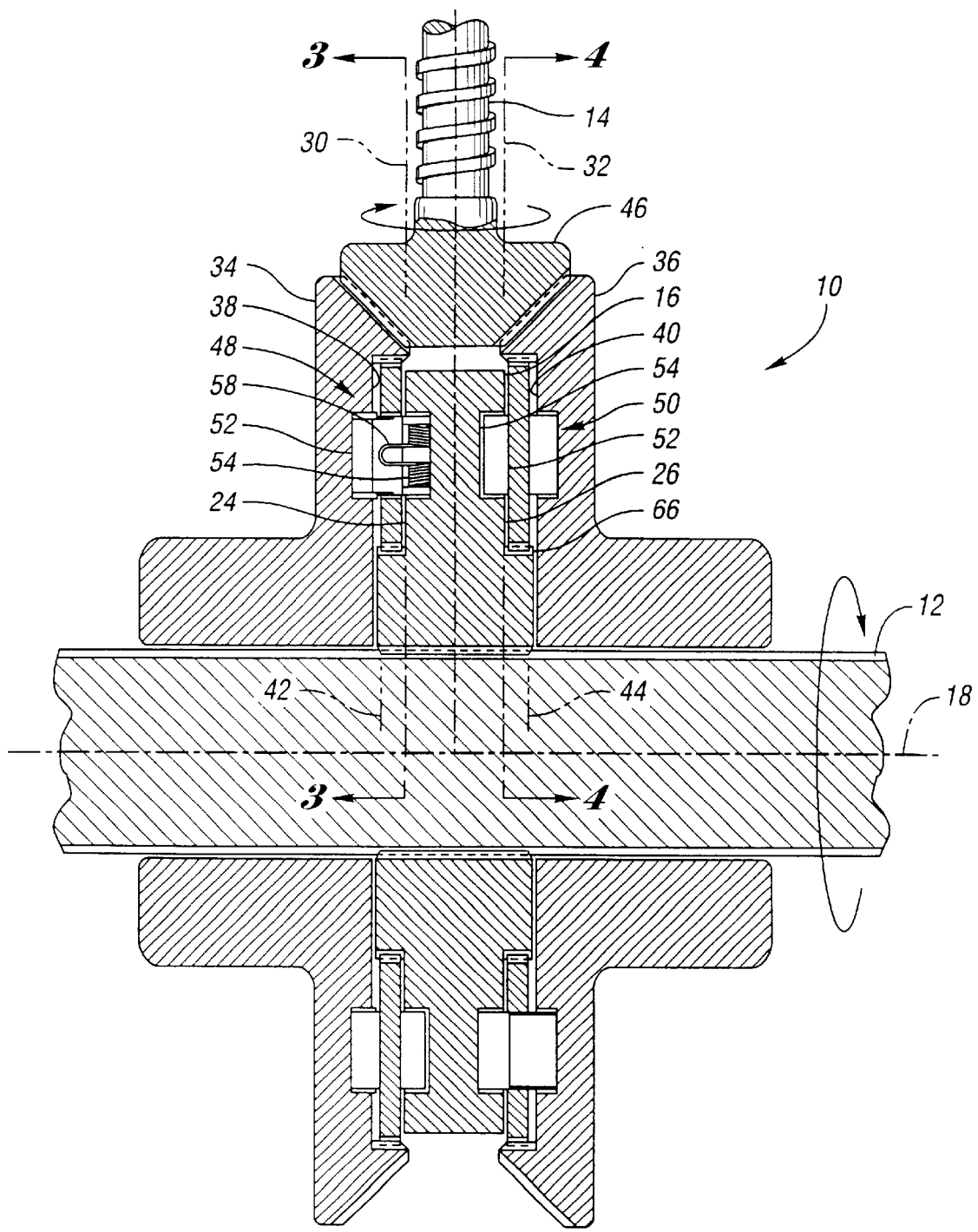
FIG. 1 is a partial section of a reducing gear set/bi-directional one-way clutch assembly in accordance with the invention.

Referring to the Drawings, an exemplary clutch assembly 10 in accordance with the invention for selectively coupling power between an input shaft 12 and an output shaft 14 is illustrated in FIG. 1. The clutch assembly 10 includes a driving member 16 mounted on the input shaft 12 for rotation about a first axis 18 in both a first rotational direction (as illustrated by arrow 20 in FIGS. 1–4) and a second rotational direction (as illustrated by arrow 22 in FIGS. 2–4). The driving member 16 has a driving face 24,26 on either side, with each driving face defining a reference surface 30,32 that is generally perpendicular to the first axis 18.

The clutch assembly 10 further includes a driven member 34,36 disposed on either side of the driving member 16 and likewise rotatable about the first axis 18. Each driven member 34,36 is positioned relative to the driving member 16 so as to place a respective driven face 38,40 in close-spaced opposition with a respective one of the driving member's driving faces 24,26. In this manner, the driven face 38,40 of each driven member 34,36 defines a respective reference surface 42,44 that is likewise generally perpendicular to the first axis 18.

A respective radially-outer surface portion of each driven member 34,36 includes a plurality of circumferentially-spaced gear teeth such that the driven members 34,36 together define a pair of opposed bevel gears. A pinion gear 46, which is likewise a bevel gear that is mounted for rotation on one end of the output shaft 16, includes a plurality of gear teeth that simultaneously meshingly engage with the respective gear teeth of each driven member 34,36.

Figure 2:
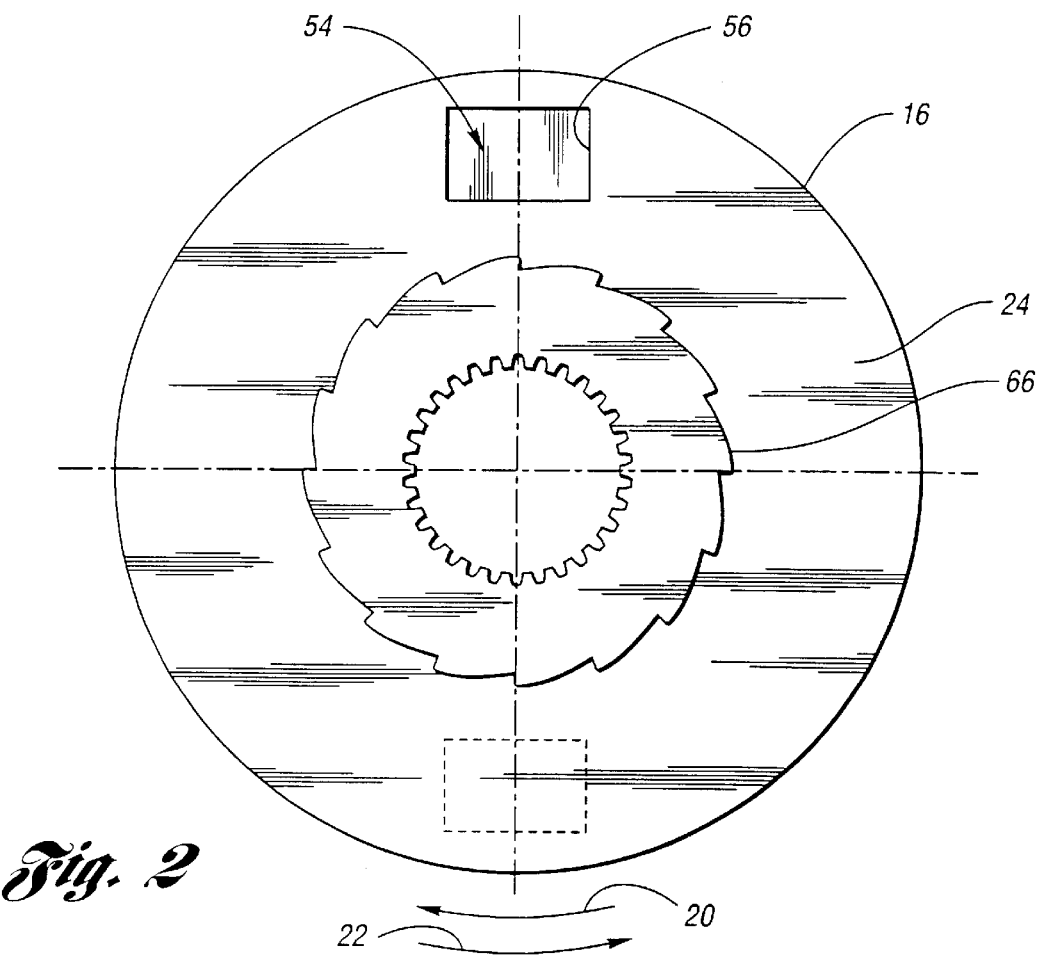
FIG. 2 is a plan view of the first driving face of the clutch assembly's driving member.
Figure 3:
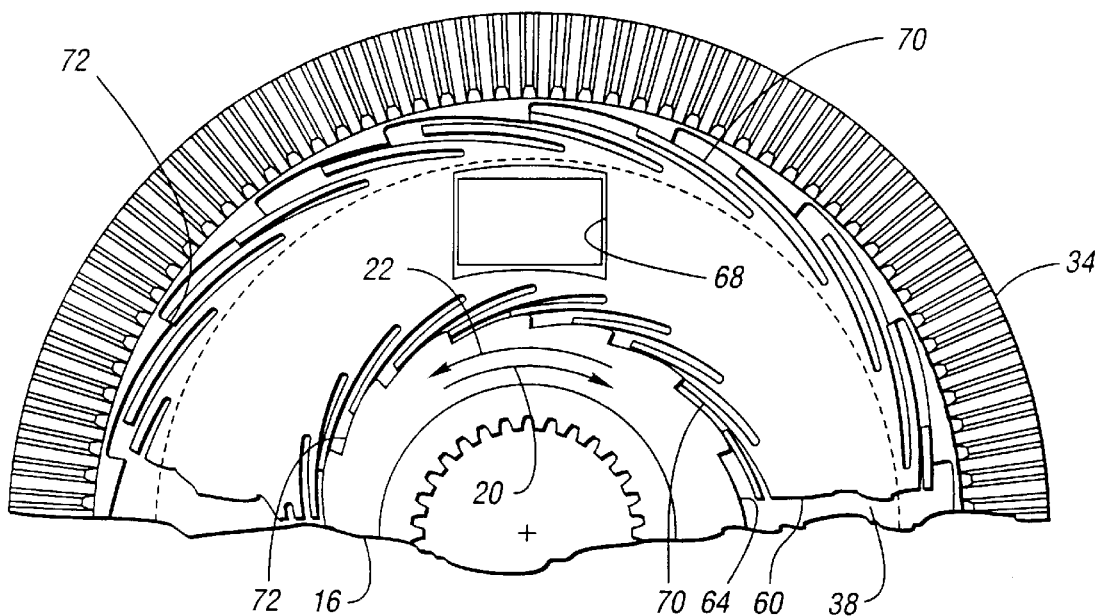
FIG. 3 is a sectional view of the assembly of FIG. 1 taken along line 3—3 thereof.

In accordance with the invention, and as illustrated in FIGS. 1–3, the clutch assembly 10 also includes a pair of couplings 48,50 which respectively cooperate with features of the driving member 16 and the first driven member 34, and of the driving member 16 and the second driven member 36, to thereby respectively define a selectably-operative one-way clutch between the driving member 16 and each driven member 34,36. While the invention contemplates use of any suitable couplings and driving/driven member features by which to provide such selectably-operative one-way clutches, in the exemplary clutch assembly 10, each coupling 48,50 includes a flat strut 52 disposed between a driving face 24,26 respectively defined on the respective sides of the driving member 16, and a driven face 38,40 respectively defined on the first and second driven members 34,36.

Figure 4:
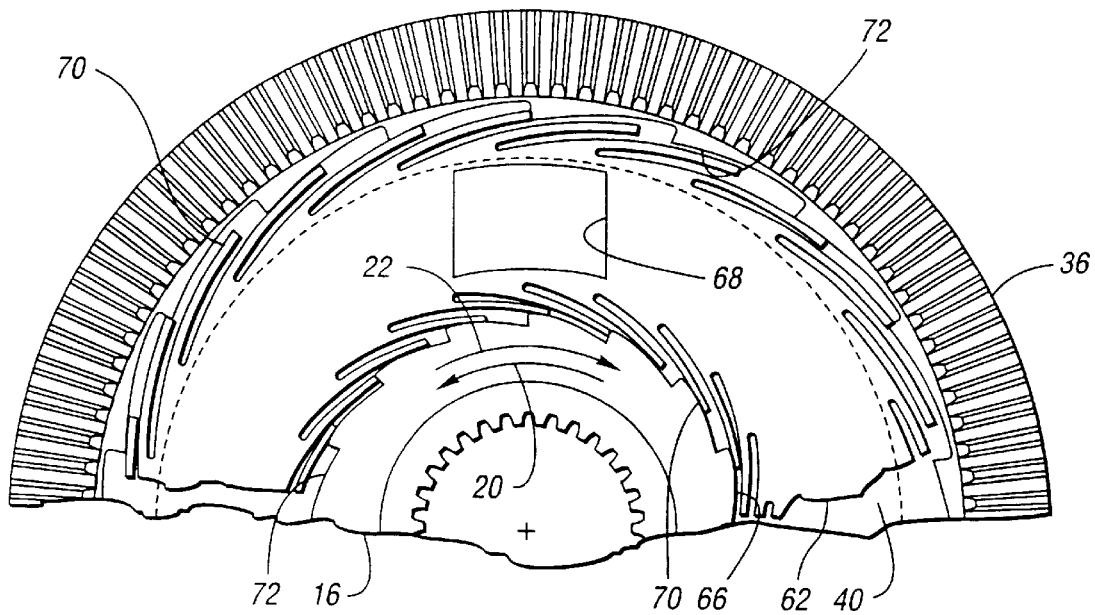
FIG. 4 is a sectional view of the assembly of FIG. 1 taken along line 4—4 thereof.

More specifically, as illustrated more clearly in FIGS. 2–4, each strut 52 is carried within a recess 54 defined in one of the driving faces 24,26 of the driving member 16. Each recess 54 includes a load-bearing shoulder 56 that is capable of abuttingly engaging an end of the strut 52 when the driving member 16 is rotated in the first rotational direction 20. As seen in the detail plan view of the driving member 16 illustrated in FIG. 2, the recess 54 defined in the second driving face 26 is angularly offset from, i.e., is not axially aligned with, the recess 54 defined in the first driving face 24. By way of example only, in the exemplary clutch assembly 10, the recess 54 defined in the second driving face 26 of the driving member 16 is diametrically opposite the recess 54 defined in the first driving face 24 of the driving member 16, to achieve better rotational balance. It will be appreciated that the invention contemplates use of more than one recess 54 defined on each driving face 24,26 of the driving member 16, preferably likewise positioned for better rotational balance.

Each strut 54 of each coupling 48,50 is movable between a first position and a second position. The first position of each strut 54 is characterized by engagement of the strut 54 with the load-bearing shoulders 56 defined in one of the driving faces 24,26 of the driving member 16 and in a driven face 38,40 of one of the driven members 34,36 (as illustrated in FIG. 1 with respect to the strut 54 engaging both the first driving face 24 of the driving member 16 and the driven face 38 of the first driven member 34). The second position of each strut 54 is characterized by the non-engagement of one end of the strut 54 with the driven face 38,40 of its respective driven member 34,36 (as illustrated in FIG. 1 with respect to the strut 54 carried by the second driving face 26 of the driving member 16 which does not extend into engagement with the opposed driven face 40 of the second driven member 36). A spring 58 carried, for example, within each recess 54 of the driving member 16 urges each strut 54 toward the strut's second position.

Each coupling 30,32 further includes a generally-planar strut retainer 60,62 disposed between the respective driving and driven faces 24,26,38,40 and mounted for rotation about the first axis 18 on a respective projecting hub 64,66 of the driving member 16. Each strut retainer 60,62 includes at least one and, preferably, a plurality of openings 68. When a given opening 68 of the either strut retainer 60,62 is generally aligned with a given recess 54 of the driving member 16, the strut 52 carried within the given recess 54 extends through the given opening 68 to thereby move towards the strut's first position, i.e., into engagement with the driven face 38,40 of one of the driven members 34,36. When no opening 68 of a given strut retainer 60,62 is generally aligned with a given strut's recess 54, the strut retainer 60,62 operates to urge the struts 52 toward their respective second positions, thereby preventing engagement of any strut 52 with its respective driven member 34,36 and, hence, "disabling" the one-way clutch feature on the given strut retainer's side of the clutch assembly 10.

In accordance with the invention, each strut retainer 60,62 rotates with the driving member 16 only when the driving member 16 is rotated in the first rotational direction 20 relative to its respective driven member 34,36, and, further, rotates with its respective driven member 34,36 only when the driving member 16 rotates in the second rotational direction 22 relative to that driven member 34,36. In this manner, a given strut 52 is urged by its respective coupling's strut retainer 60,62 into the given strut's second, non-engaging position by controllably rotating the driving member 16 in the second rotational direction 22, such that the strut retainer 60,62 assumes a first predetermined rotational position relative to the driving member 16. The given strut's respective coupling 48,50 is disabled, and the driving member 16 is thereafter free to "free-wheel" in the first rotational direction 20. It will be appreciated that, upon subsequent further rotation of the driving member 16 in the second rotational direction 22 relative to the given strut's driven member 34,36, the strut retainer 60,62 will rotate with the driving member 16 out of the predetermined coupling-disabling rotational position, whereupon the coupling 48,50 is enabled to transmit power from the driving member 16 to the strut's respective driven member 34,36 upon subsequent relative rotation of the driving member 16 in the first rotational direction 16 (as well as permitting the "free-wheeling" of the driven member 34,36 relative to the driving member 16 when the driven member 34,36 overruns the driving member 16 while rotating in the first rotational direction 20).

While the invention contemplates use of any suitable structure by which the movement of the strut retainers 60,62 are controlled as described above, in the exemplary clutch assembly 10, the radially-innermost and radially-outermost portions of each strut retainer 60,62 includes a plurality of spring tabs 70 which cooperate with ratchet surfaces 72 respectively defined on the driving member 16 (on its projecting hub 64) and each of the driven members 34,36.

Figure 5:
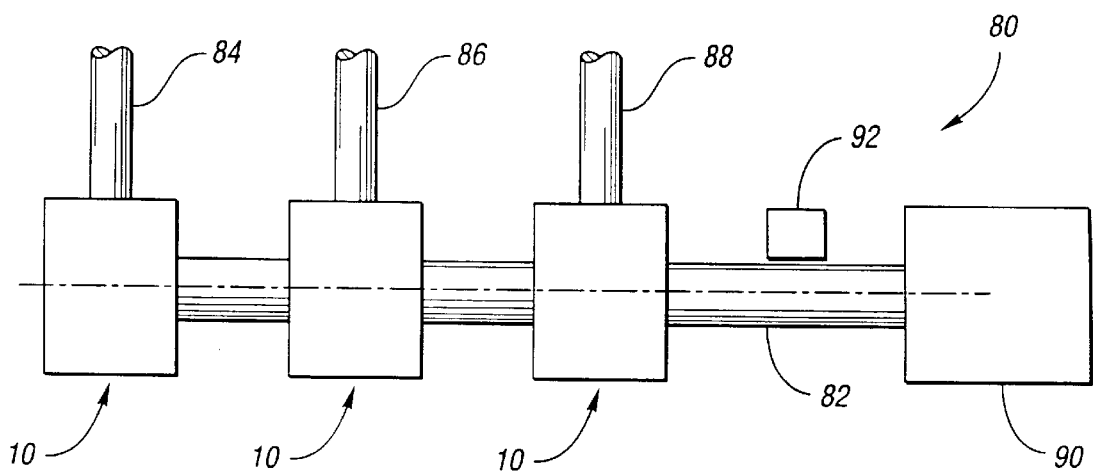
FIG. 5 is a partially-schematic illustration of a power seat drive assembly for a motor vehicle that incorporates three clutch assemblies in accordance with the invention.

FIG. 5 is a partially-schematic illustration of a system 80 in which three discrete clutch assemblies 10 are deployed along a common drive shaft 82 to thereby selectively drive three discrete output shafts 84,86,88 in a desired rotational direction while the common drive shaft provides driving power to the clutch assemblies 10 in but a single rotational direction (the first rotational direction 20, as described above in connection with the exemplary clutch assembly 10). Such a system 80 is advantageously deployed, for example, in connection with the operation of a power seat of a motor vehicle (not shown), with the common drive shaft being driven by a single electric motor 90. A Hall-effect sensor, shown schematically at 92, is advantageously used to detect the relative rotational position of the driving member 16, for use in selectively "enabling" and "disabling" the respective couplings 48,50 of the system's several clutch assemblies 10.

In order to ensure that only selected ones of the system's six couplings 48,50 are "enabled" while leaving the remaining couplings 48,50 "disabled," the recesses 28 defined in the several drive members 16 and/or the openings 68 in the several strut retainers 60,62 are all angularly offset from one another. Moreover, in order to permit the enablement of all available combinations of the system's three pairs of couplings 48,50, the recesses 28 of the several drive members 16 and/or the openings 68 of the several strut retainers 60,62 are preferably positioned about the first axis 18 such that a different one or combination of the system's six couplings 48,50 are "enabled" with every 13.33 degrees of relative rotation of the system's driving members 16 in the second direction 22 relative to the system's driven members 34,36 (calculated as 360 degrees of total rotation, divided by the 27 available coupling combinations for a system 80 employing three exemplary clutch assemblies 10, each clutch assembly featuring three operational settings). Indeed, in a preferred embodiment of the exemplary system 80, three additional (though operationally redundant) positions are added to thereby provide 30 positions, at a relatively more convenient 12-degree interval, by which to select an available one or combination of enabled couplings 48,50.

While an exemplary embodiment of the invention has been illustrated and described, it is not intended that the exemplary embodiment illustrate and describe all possible forms of the invention. Rather, the words used in the specification are words of description rather than limitation, and it is understood that various changes may be made without departing from the spirit and scope of the invention. For example, while the driving member of the exemplary clutch assembly 10 includes two driving faces, it will be appreciated that the invention contemplates the use of two separate driving members, each with but a single driving face, that are coupled together for synchronous rotation, even about non-collinear axes.

What I claim is:

1. A clutch assembly comprising:
   a driving member rotatable about a first axis in a first rotational direction and in a second rotational direction opposite to the first rotational direction, the driving member including a first driving face having a recess defining a load-bearing shoulder;
   a first driven member rotatable about the first axis, the first driven member including a driven face in close-spaced opposition with the first driving face of the driving member, the first driven face including a plurality of recesses, each recess defining a respective load-bearing shoulder; and
   a first coupling disposed between the first driving face of the driving member and the driven face of the first driven member, the first coupling including:
      a first strut moveable between a first position and a second position, wherein the first position of the first strut is characterized by simultaneous abutting engagement of the first strut with a respective shoulder of both the first driving face of the driving member and the driven face of the first driven member, and wherein the second position of the first strut is characterized by non-engagement of the first strut with at least one of the first driving face of the driving member and the driven face of the first driven member,
      a first spring urging the first strut toward the first position, and
      a first strut retainer rotatable about the first axis, wherein the first strut retainer is rotatable about the first axis to rotate with the driving member only when the driving member is rotated in the first rotational direction relative to the first driven member, and to rotate with the first driven member only when the driving member rotates in the second rotational direction relative to the first driven member, and wherein the first strut retainer urges the first strut to the second position when the first strut retainer is rotated into a first predetermined rotational position relative to the driving member.

2. The clutch assembly of claim 1, wherein the first strut is carried in the recess defined in the first driving face of the driving member.

3. The clutch assembly of claim 1, including a sensor for detecting when the first strut retainer is in the first rotational position.

4. The clutch assembly of claim 1, wherein the first driven member includes a plurality of circumferentially-spaced gear teeth defined on a radially-outward surface portion, whereby the first driven member defines a first driving gear for engagement with a pinion.

5. The clutch assembly of claim 1, wherein the driving member includes a second driving face having at least one recess defining a load-bearing shoulder, and further including:
   a second driven member rotatable about the first axis, the second driven member including a second driving face in close-spaced opposition with the second driving face of the driving member, the driven face of the second driven member including a plurality of recesses, each recess defining a respective load-bearing shoulder; and
   a second coupling disposed between the second driving face of the driving member and the driven face of the second driven member, the second coupling including:
      a second strut moveable between a first position and a second position, wherein the first position of the second strut is characterized by simultaneous abutting engagement of the second strut with a respective shoulder of both the second driving face of the driving member and the driven face of the second driven member, and wherein the second position of the second strut is characterized by non-engagement of the second strut with at least one of the second driving face of the driving member and the driven face of the second driven member,
      a second spring urging the second strut toward the first position, and
      a second strut retainer rotatable about the first axis, wherein the second strut retainer rotates with the driving member only when the driving member is rotated in the first rotational direction relative to the second driven member, and rotates with the second driven member only when the driving member rotates in the second rotational direction relative to the second driven member, and wherein the second strut retainer urges the second strut to the second position when the second strut retainer is rotated into a second predetermined rotational position relative to the driving member.

6. The clutch assembly of claim 5, wherein each strut of the second coupling is angularly offset from each strut of the first coupling.

7. The clutch assembly of claim 5, wherein the first strut is carried in the recess defined in the first driving face of the driving member, and wherein the second strut is carried in the recess defined in the second driving face of the driving member.

8. The clutch assembly of claim 7, wherein the first and second predetermined rotational positions are defined by the respective relative angular position of the recess defined in the respective first and second driving faces of the driving member, the relative angular position of the recess of the first driving face differing from the relative angular position of the recess of the second driving face.

9. The clutch assembly of claim 5, wherein the first and second driven members respectively include a plurality of circumferentially-spaced gear teeth, whereby the first and second driven members define a respective first and second driving gear for simultaneous meshing engagement with a common pinion such that rotary power transmitted between the driven members through the pinion causes the driven members to rotate in opposite rotational directions.

10. The clutch assembly of claim 5, wherein each driving face of the driving member and the driven faces of the first and second driven members define respective reference planes that are generally normal to the first axis.

11. The clutch assembly of claim 9, wherein the first driving face of the driving member is in close-spaced opposition with the driven face of the first driven member, and wherein the second driving face of the driving member is in close-spaced opposition with the driven face of the second driven member.

12. A clutch assembly for coupling an input shaft to an output shaft, the clutch assembly comprising:

a driving member rotatable about a first axis and selectively driven by the input shaft in each of a first rotational direction and a second rotational direction opposite to the first rotational direction, the driving member including a first driving face having a strut-receiving recess and a second driving face having a strut-receiving recess, each strut-receiving recess defining a load-bearing shoulder, the load-bearing shoulder of the strut-receiving recess of the first driving face being angularly offset from the load-bearing shoulder of the strut-receiving recess of the second driving face;

a first driven member rotatable about the first axis, wherein the first driven member includes a first driven face in close-spaced opposition with the first driving face of the driving member, the first driven face including a plurality of recesses, each recess of the first driven member defining a load-bearing shoulder, and wherein the first driven member includes a plurality of circumferentially-spaced gear teeth;

a first coupling disposed between the first driving face of the driving member and the driven face of the first driven member, the first coupling including:

a first strut moveable between a first position and a second position, wherein the first position of the first strut is characterized by simultaneous abutting engagement of the first strut with a respective shoulder of both the first driving face of the driving member and the driven face of the first driven member, and wherein the second position of the first strut is characterized by non-engagement of the first strut with at least one of the first driving face of the driving member and the driven face of the first driven member, a first spring urging the first strut toward the first position, and a first strut retainer rotatable about the first axis, wherein the first strut retainer is rotatable about the first axis to rotate with the driving member only when the driving member is rotated in the first rotational direction relative to the first driven member, and to rotate with the first driven member only when the driving member rotates in the second rotational direction relative to the first driven member, and wherein the first strut retainer urges the first strut to the second position when the first strut retainer is rotated into a first predetermined rotational position relative to the driving member;

a second driven member rotatable about the first axis, wherein the second driven member includes a second driven face in close-spaced opposition with the second driving face of the driving member, the second driven face including a plurality of recesses, each recess of the second driven member defining a load-bearing shoulder, and wherein the second driven member includes a plurality of circumferentially-spaced gear teeth; and a second coupling disposed between the second driving face of the driving member and the driven face of the second driven member, the second coupling including:

a second strut moveable between a first position and a second position, wherein the first position of the second strut is characterized by simultaneous abutting engagement of the second strut with a respective shoulder of both the second driving face of the driving member and the driven face of the second driven member, and wherein the second position of the second strut is characterized by non-engagement of the second strut with at least one of the second driving face of the driving member and the driven face of the second driven member, a second spring urging the second strut toward the first position, and a second strut retainer rotatable about the first axis, wherein the second strut retainer rotates with the driving member only when the driving member is rotated in the first rotational direction relative to the second driven member, and rotates with the second driven member only when the driving member rotates in the second rotational direction relative to the second driven member, and wherein the second strut retainer urges the second strut to the second position when the second strut retainer is rotated into a second predetermined rotational position relative to the driving member; and a pinion coupled to the output shaft, the pinion having gear teeth that simultaneously mesh with the respective peripheral gear teeth of the first and second driven members such that rotary power transmitted between the driven members through the pinion causes the driven members to rotate in opposite rotational directions.

13. The clutch assembly of claim 12, wherein the coupling face of each member defines a reference surface that is generally normal to the first axis.

14. The clutch assembly of claim 12, further including a sensor generating a signal representative of the relative rotational position of the driving member.

* * * * *